(12) United States Patent
Kim et al.

(10) Patent No.: US 9,869,900 B2
(45) Date of Patent: Jan. 16, 2018

(54) LIQUID CRYSTAL DISPLAY PANEL AND METHOD OF MANUFACTURING THE SAME

(71) Applicant: Samsung Display Co. Ltd., Yongin, Gyeonggi-do (KR)

(72) Inventors: Min Su Kim, Seoul (KR); Jang Hyun Kim, Hwaseong-si (KR); Joo Young Yoon, Suwon-si (KR); Hyoung Sub Lee, Yongin-si (KR); Tae Woon Cha, Seoul (KR)

(73) Assignee: Samsung Display Co., Ltd. (KR)

( * ) Notice: Subject to any disclaimer, the term of this patent is extended or adjusted under 35 U.S.C. 154(b) by 93 days.

(21) Appl. No.: 14/867,874

(22) Filed: Sep. 28, 2015

(65) Prior Publication Data

US 2016/0216563 A1    Jul. 28, 2016

(30) Foreign Application Priority Data

Jan. 23, 2015  (KR) .......................... 10-2015-0011306

(51) Int. Cl.
*C09K 19/00* (2006.01)
*G02F 1/1337* (2006.01)
*G02F 1/1339* (2006.01)

(52) U.S. Cl.
CPC ...... *G02F 1/133723* (2013.01); *G02F 1/1339* (2013.01); *G02F 2201/50* (2013.01); *Y10T 428/10* (2015.01); *Y10T 428/1005* (2015.01); *Y10T 428/1023* (2015.01)

(58) Field of Classification Search
CPC ......... G02F 1/133723; G02F 1/133711; G02F 1/1337; G02F 1/1339; G02F 1/13394; G02F 2001/13398; Y10T 428/10; Y10T 428/1005; Y10T 428/1018; Y10T 428/1023
USPC ........ 428/1.1, 1.2, 1.25, 1.26; 349/123, 153, 349/156, 190; 445/25; 427/162
See application file for complete search history.

(56) References Cited

U.S. PATENT DOCUMENTS

| | | | | |
|---|---|---|---|---|
| 5,579,141 | A | * 11/1996 | Suzuki | ............. G02F 1/133788 349/124 |
| 2005/0003110 | A1 | 1/2005 | Tanaka et al. | |
| 2013/0101755 | A1* | 4/2013 | Lee | .................. G02F 1/133707 428/1.23 |

FOREIGN PATENT DOCUMENTS

| | | |
|---|---|---|
| KR | 10-2004-0093052 | 11/2004 |
| KR | 10-2005-0066747 A | 6/2005 |
| KR | 10-2007-0041913 A | 4/2007 |
| KR | 10-2014-0031302 | 3/2014 |
| KR | 10-2014-0032728 | 3/2014 |

* cited by examiner

*Primary Examiner* — Ruiyun Zhang
(74) *Attorney, Agent, or Firm* — Innovation Counsel LLP

(57) ABSTRACT

A liquid crystal display panel includes substrates opposed to each other, a liquid crystal layer interposed between the substrates, a seal line surrounding an outer peripheral portion of the liquid crystal layer and disposed between the substrates and a liquid crystal alignment layer including a polyimide, the liquid crystal alignment layer including a first region and a second region disposed in an outer peripheral portion of the first region and disposed on one surface of at least one of the substrates, wherein at least a portion of the second region is overlapped with the seal line, the second region having a surface roughness value greater than that of the first region.

20 Claims, 16 Drawing Sheets

LIQUID CRYSTAL DISPLAY PANEL AND METHOD OF MANUFACTURING THE SAME

CROSS-REFERENCE TO RELATED APPLICATION

This application claims priority from Korean Patent Application No. 10-2015-0011306 filed on Jan. 23, 2015 in the Korean Intellectual Property Office, the disclosure of which is incorporated herein by reference in its entirety.

BACKGROUND

1. Field of the Invention

The invention relates to a liquid crystal display panel and a method of manufacturing the same.

2. Description of the Related Art

In general, a liquid crystal display panel displaying an image may include a thin film transistor (TFT) substrate, an opposite substrate opposed to the TFT substrate, and a liquid crystal layer interposed between the opposite substrate and the TFT substrate. The TFT substrate includes a TFT formed in each of a plurality of pixel regions in order to independently drive each of the pixel regions.

Regions of a liquid crystal display panel may be classified into a display region substantially displaying an image and a bezel region enclosing the display region. The display region may be provided with a pixel unit including a gate line, a data line, a TFT and the like, and the bezel region may be provided with a gate driving unit for applying a gate signal to the gate line, or the like.

Recently, in order to reduce an area of the liquid crystal display panel, the development of a structure for decreasing a width of the bezel region has been conducted. For example, the development of a structure for maximally decreasing a width of a black matrix formed in the bezel region of the opposite substrate and a width of a seal line allowing for adhesion between a display substrate and the opposite substrate has been ongoing.

In the case in which a width of the bezel region is decreased, moisture or humidity may be introduced into the liquid crystal display panel through an interface between a polyimide-based liquid crystal alignment layer and a seal line, such that the interior of the liquid crystal display panel may be corroded and a border residue may be caused. Eventually, the TFT substrate and the opposite substrate may be separated from each other.

SUMMARY

A liquid crystal display panel having improved moisture-proofing properties and including a bezel region having a narrow width, and a method of manufacturing the same are provided.

However, aspects of the invention are not restricted to the one set forth herein. The above and other aspects of the invention will become more apparent to one of ordinary skill in the relevant art by referencing the detailed description given below.

In one aspect, a liquid crystal display panel includes substrates opposed to each other, a liquid crystal layer interposed between the substrates, a seal line surrounding an outer peripheral portion of the liquid crystal layer and disposed between the substrates and a liquid crystal alignment layer including a polyimide, the liquid crystal alignment layer including a first region and a second region disposed in an outer peripheral portion of the first region and disposed on one surface of at least one of the substrates, wherein at least a portion of the second region is overlapped with the seal line, the second region having a surface roughness value greater than that of the first region.

According to another aspect, a liquid crystal display panel includes substrates opposed to each other, a liquid crystal layer interposed between the substrates, a seal line surrounding the liquid crystal layer and disposed between the substrates and a liquid crystal alignment layer including a polyimide, the liquid crystal alignment layer including a first region and a second region disposed in an outer peripheral portion of the first region and disposed on one surface of at least one of the substrates, wherein at least a portion of the second region is overlapped with the seal line, the second region having a content of a hydrophilic group greater than that of the first region.

According to another aspect, a method of manufacturing a liquid crystal display panel, the method includes selectively performing hydrophilic surface treatment on only a second region of first and second regions of a liquid crystal alignment layer including a polyimide, and applying a sealant to the second region.

BRIEF DESCRIPTION OF DRAWINGS

The above and other aspects and features of the disclosure will become more apparent by describing in detail exemplary embodiments thereof with reference to the attached drawings, in which.

DETAILED DESCRIPTION

Figure 1:
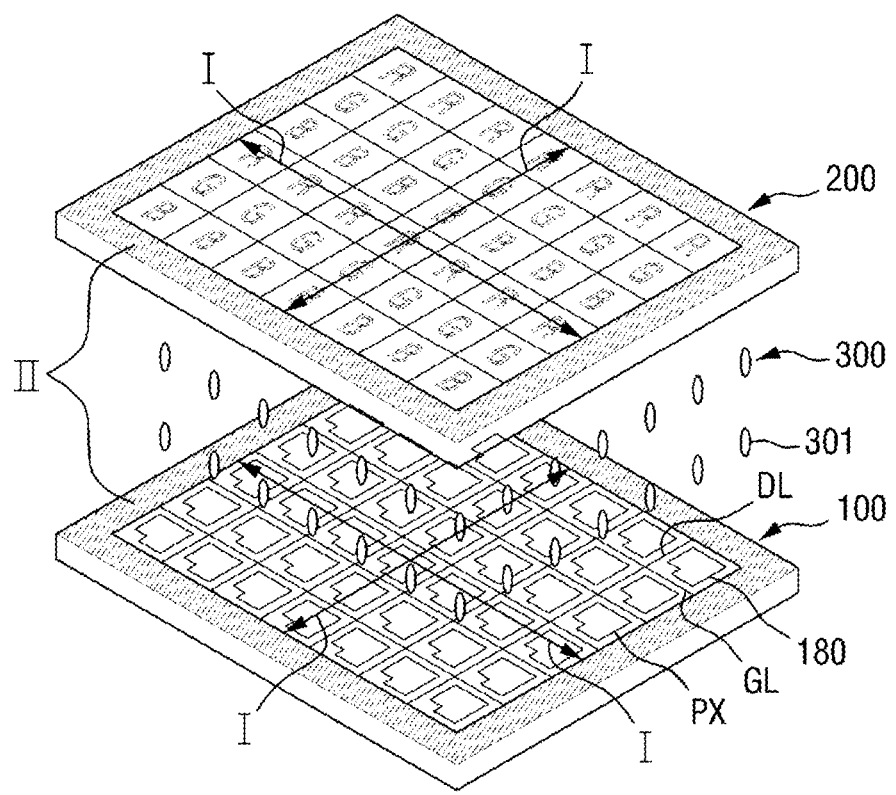
FIG. 1 is a schematic exploded perspective view of a liquid crystal display panel according to a first exemplary embodiment.

Features of the inventive concept and methods of accomplishing the same may be understood more readily by reference to the following detailed description of example embodiments and the accompanying drawings. The inventive concept may, however, be embodied in many different forms and should not be construed as being limited to the embodiments set forth herein. Rather, these embodiments are provided so that this disclosure will convey the concept of the inventive concept to those of ordinary skill in the relevant art.

In the drawings, the thickness of layers and regions are exaggerated for clarity. It will be understood that when an element or layer is referred to as being "on," "connected to" or "coupled to" another element or layer, the element or layer can be directly on, connected or coupled to another element or layer, or one or more intervening elements or layers may be present. In contrast, when an element is referred to as being "directly on," "directly connected to" or "directly coupled to" another element or layer, there are no intervening elements or layers present. As used herein, connected may refer to elements being physically, electrically, operably, and/or fluidly connected to each other.

Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the disclosure.

Spatially relative terms, such as "below," "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" relative to other elements or features would then be oriented "above" relative to the other elements or features. Thus, the example term "below" can encompass both an orientation of above and below, depending on the orientation. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list. Further, the use of "may" when describing embodiments refers to "one or more embodiments." Also, the term "example" is intended to refer to an example or illustration. As used herein, the terms "use," "using," and "used" may be considered synonymous with the terms "utilize," "utilizing," and "utilized," respectively.

Hereinafter, example embodiments of the inventive concept will be described in detail with reference to figures and comparative examples are also described.

Figure 2:
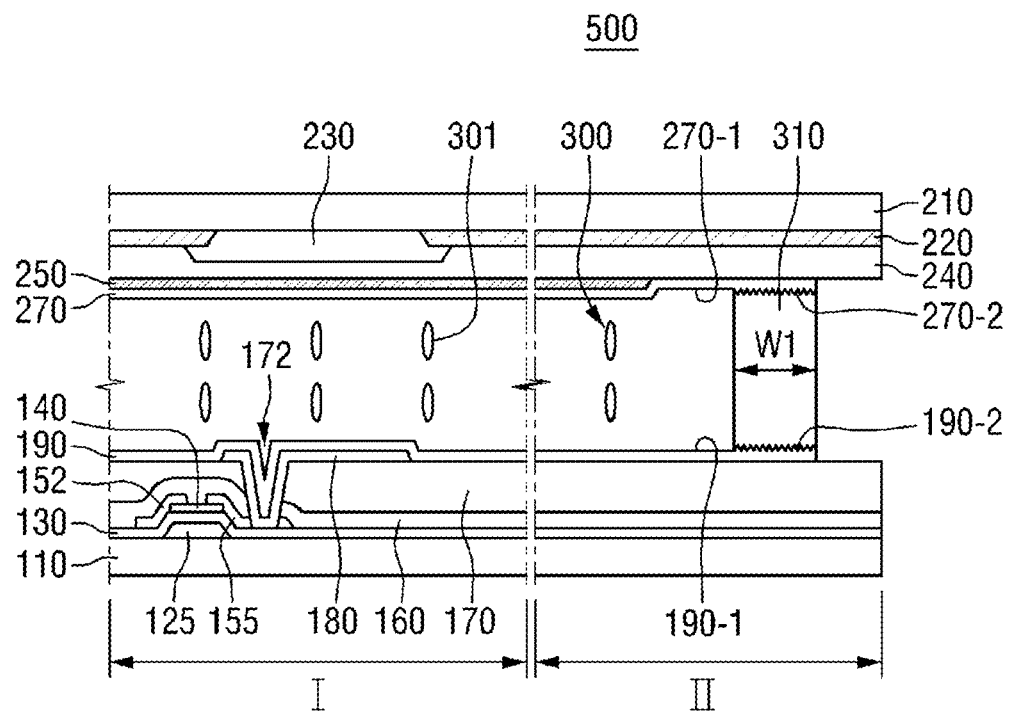
FIG. 2 is a schematic cross-sectional view of the liquid crystal display panel according to the first exemplary embodiment.

FIG. 1 is a schematic exploded perspective view of a liquid crystal display panel 500 according to a first exemplary embodiment. FIG. 2 is a schematic cross-sectional view of the liquid crystal display panel 500 according to the first exemplary embodiment.

Referring to FIGS. 1 and 2, the liquid crystal display panel 500 may include a first display substrate 100, a second display substrate 200 spaced apart from the first display substrate 100 and disposed to be opposed thereto, and a liquid crystal layer 300 interposed between the first display substrate 100 and the second display substrate 200. Each of the first display substrate 100 and the second display substrate 200 may include a display region I and a non-display region II. In the display region I, a plurality of pixels PX arranged in a matrix form may be defined.

In the display region I of the first display substrate 100, a plurality of gate lines GL extended in a first direction and a plurality of data lines DL extended in a second direction perpendicular with respect to the first direction may be formed. Pixel electrodes 180 may be disposed on the respective pixels PX defined by the gate lines GL and the data lines DL.

The pixel electrode 180 may receive a data voltage through a thin film transistor (TFT), which is a switching element. A gate electrode 125, which is a control terminal of the TFT, may be connected to the gate line GL. A source electrode 152, which is an input terminal of the TFT, may be connected to the data line DL. A drain electrode 155, which is an output terminal of the TFT, may come into contact with the pixel electrode 180 to be electrically connected thereto.

A channel of the TFT may be formed as a semiconductor layer 140. The semiconductor layer 140 may be disposed to be overlapped with the gate electrode 125. The source electrode 152 and the drain electrode may be spaced apart from each other based on the semiconductor layer 140. The pixel electrode 180 may generate an electrical field together with a common electrode 250 and may control a direction of alignment of liquid crystal molecules 301 provided in the liquid crystal layer 300.

The non-display region II, which is a circumferential portion of the display panel 500, may surround the display region I. In the non-display region II of the first display substrate 100, a driving unit (not shown) providing a gate driving signal, a data driving signal or the like to the respective pixels of the display region I may be disposed.

In the display region I of the second display substrate 200, color filters 230 may be formed in the respective pixels PX. The color filters 230 may include red, green, and blue color filters 230. The red, green, and blue color filters 230 may be alternately arranged. A light shielding pattern 220 may be disposed in boundaries between the respective color filters 230. In addition, the light shielding pattern 220 may be disposed into the non-display region II of the second display substrate 200. The light shielding pattern 220 of the non-display region II may have a width greater than that of the light shielding pattern 220 formed in the boundary between the color filters 230. The common electrode 250 integrally formed regardless of the pixels PX may be disposed on the entire surface of the display region I.

The first display substrate 100 and the second display substrate 200 may be bonded to each other by a seal line 310 formed of a sealant or the like. The seal line 310 may be positioned on the non-display regions II of the first display substrate 100 and the second display substrate 200 as circumferential portions thereof. The seal line 310 may be formed along peripheral portions of the display regions I to surround the display regions I. Thus, the first display substrate 100 and the second display substrate 200 may be bonded to each other by the seal line 310, and a predetermined space may be defined between the substrates. The liquid crystal layer 300 may be interposed in the defined space to thereby prevent the liquid crystal molecules 301 from escaping outwardly.

Hereinafter, the liquid crystal display panel 500 will be described in further detail. The first display substrate 100 may include a first substrate 110 as a base substrate. The first substrate 110 may have the display region I and the non-display region II. The first substrate 110 may be formed as a transparent insulating substrate formed of, for example, glass or transparent plastics.

The gate line GL formed of a conductive material and the gate electrode 125 protruded therefrom may be disposed on the first substrate 110 of the display region I. Although not illustrated in the drawings, the gate line GL may be extended into the non-display region II and may form a gate pad (not shown) in the non-display region II. The gate line GL and the gate electrode 125 may be covered by a gate insulating layer 130. The gate insulating layer 130 may be formed into the non-display region II.

The semiconductor layer 140 and an ohmic-contact layer (not shown) may be formed on the gate insulating layer 130 in the display region I. The source electrode 152 branched from the data line DL and the drain electrode 155 spaced apart from the source electrode 152 may be formed on the semiconductor layer 140 and the ohmic-contact layer. Although not illustrated in the drawings, the data line may be extended into the non-display region II and may form a data pad (not shown) in the non-display region II.

A passivation layer 160, a type of an insulating layer formed of an insulating material such as a silicon nitride layer, a silicon oxide layer, a silicon oxynitride layer or the like, may be formed on the source electrode 152 and the drain electrode 155. An organic layer 170 formed of an organic material may be formed on the passivation layer 160. The passivation layer 160 and the organic layer 170 may be formed into the non-display region II. The passivation layer 160 may also be omitted.

On the organic layer 170 of the display region I, a pixel electrode 180 formed of a conductive material may be formed for each pixel PX. The pixel electrode 180 may be electrically connected to the drain electrode 155 through a contact hole 172 penetrating through the organic layer 170 and the passivation layer 160 to expose the drain electrode 155. The pixel electrode 180 may be formed of an indium tin oxide, an indium zinc oxide, an indium oxide, a zinc oxide, a tin oxide, a gallium oxide, a titanium oxide, aluminum, silver, platinum, chromium, molybdenum, tantalum, niobium, zinc, magnesium or alloys thereof or may be configured as a laminated layer thereof.

The second display substrate 200 will be described. The second display substrate 200 may include a second substrate 210 as a base substrate. The second substrate 210 may be formed as a transparent insulating substrate formed of, for example, glass or transparent plastics.

The light shielding pattern 220 may be formed on the second substrate 210. The light shielding pattern 220 may be formed into the non-display region II. The color filter 230 may be formed on the light shielding pattern 220 of the display region I. An overcoating layer 240 may be formed on the color filter 230 and the light shielding pattern 220. The overcoating layer 240 may be formed into the non-display region II.

The common electrode 250 may be disposed on the overcoating layer 240. The common electrode 250 may be formed of an indium tin oxide, an indium zinc oxide, an indium oxide, a zinc oxide, a tin oxide, a gallium oxide, a titanium oxide, aluminum, silver, platinum, chromium, molybdenum, tantalum, niobium, zinc, magnesium or alloys thereof or may be configured as a laminated layer thereof.

The common electrode 250 may be formed to cover the entirety of the display region I. However, the common electrode 250 may include a slit (not shown) or an opening (not shown) within the display region I. The common electrode 250 may be formed into a portion of the non-display region II but may not be formed in the vicinity of an edge of the second display substrate 200, such that a surface of the overcoating layer 240 may be exposed. The pixel electrode 180 of the first display substrate 100 and the common electrode 250 of the second display substrate 200 may be disposed to face each other to form an electrical field in the liquid crystal layer 300. The first display substrate 100 and the second display substrate 200 may be disposed to face each other with a predetermined cell gap maintained therebetween. The liquid crystal layer 300 may be interposed between the first display substrate 100 and the second display substrate 200 of the display region I.

A liquid crystal alignment layer 190 or 270 may be formed on at least one of surfaces of the first display substrate 100 and the second display substrate 200 contacting the liquid crystal layer 300 and the seal line 310. In a non-limited example, the liquid crystal alignment layers 190 and 270 may be polyimide-based liquid crystal alignment layers, i.e., the alignment layers include polyimide as a majority constituent. The respective liquid crystal alignment layers 190 and 270 may include first regions 190-1 and 270-1 and second regions 190-2 and 270-2. The first regions 190-1 and 270-1 may be disposed between the respective display substrates 100 and 200 and the liquid crystal layer 300, and the second regions 190-2 and 270-2 may be disposed between the respective display substrates 100 and 200 and the seal line 310.

The first regions 190-1 and 270-1 may be different from the second regions 190-2 and 270-2 in that the first regions 190-1 and 270-1 may be regions on which hydrophilic surface modification may not be performed, while the second regions 190-2 and 270-2 may be regions on which hydrophilic surface modification may be performed. The second regions 190-2 and 270-2 may be disposed in contact interfaces between the liquid crystal alignment layers 190 and 270 and the seal line 310. Widths of the second regions 190-2 and 270-2 may be identical to a width W1 of the seal line.

Surface roughness values of the second regions 190-2 and 270-2 may be greater than those of the first regions 190-1 and 270-1. This will be described in detail with reference to FIGS. 3 and 4.

Figure 3:
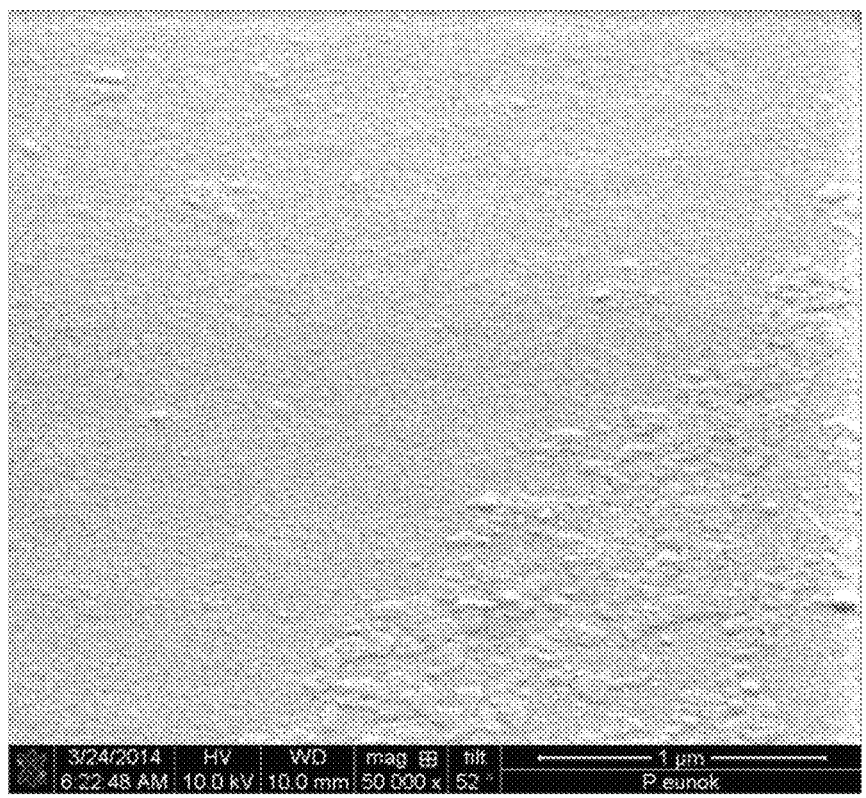
FIG. 3 is a differential scanning electron microscope (SEM) photograph showing a first region of a liquid crystal alignment layer.
Figure 4:
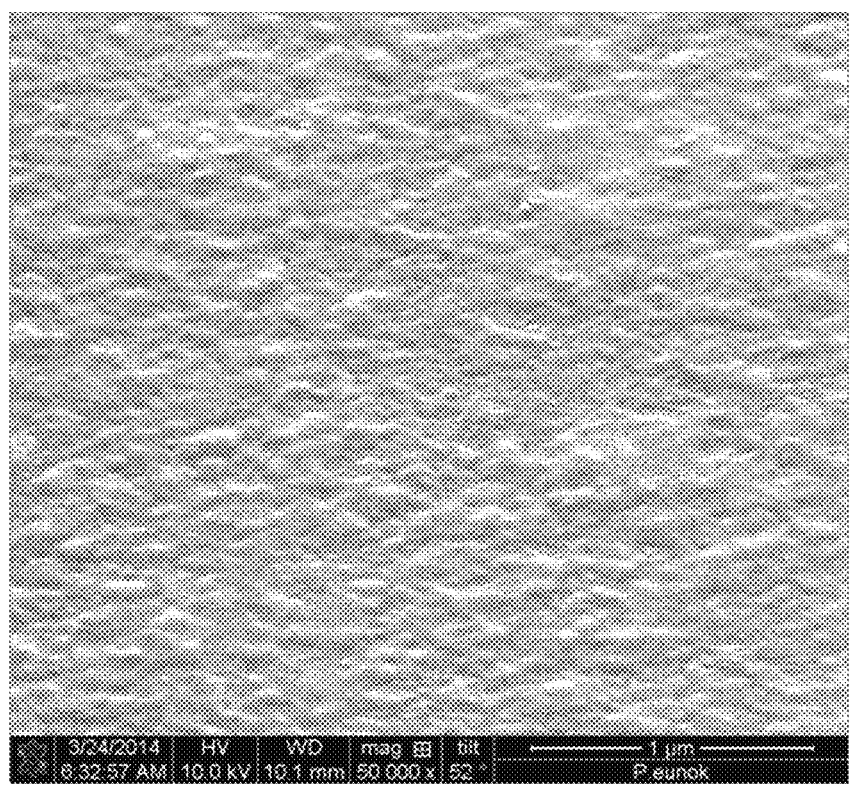
FIG. 4 is a differential scanning electron microscope (SEM) photograph showing a second region of the liquid crystal alignment layer.

FIG. 3 is a differential scanning electron microscope (SEM) photograph showing the first region of the liquid crystal alignment layer. FIG. 4 is a differential scanning electron microscope (SEM) photograph showing the second region of the liquid crystal alignment layer. Referring to FIGS. 3 and 4, a degree of surface roughness in the second regions 190-2 and 270-2 may be greater than that of in the first regions 190-1 and 270-1. Adhesive strength may be improved in the contact interfaces between the second regions 190-2 and 270-2 and the seal line 310. This will be described in detail with reference to FIG. 8.

The improved adhesive strength in the contact interfaces between the second regions 190-2 and 270-2 and the seal line 310 may provide the liquid crystal display panel 500 including a bezel region having a narrow width. Further, the improved adhesive strength in the contact interfaces between the second regions 190-2 and 270-2 and the seal line 310 may prevent or significantly reduce the penetration of moisture or impurities into the display region I. As a result, the liquid crystal display panel 500 including a narrow bezel region may have improved stability and reliability in the display quality thereof.

The hydrophilic surface treatment may provide a hydrophilic group to the second regions 190-2 and 270-2. The first regions 190-1 and 270-1 may be different from the second regions 190-2 and 270-2 in terms of the content of the hydrophilic group. The hydrophilic group may be a hydroxyl group (—OH), an amide group (—CONH—, —CONH$_2$, —CONRH, or —CONR$_2$), a carboxylic acid ester group (—OOCR), a carboxyl group (—COOH) or the like. The content of the hydrophilic group may be higher in the second regions 190-2 and 270-2 than in the first regions 190-1 and 270-1. In particular, the content of at least one hydrophilic group selected from an amide group (—CONH—, —CONH$_2$, —CONRH, or —CONR$_2$), a carboxylic acid ester group (—OOCR), and a carboxyl group (—COOH) may be higher in the second regions 190-2 and 270-2 than in the first regions 190-1 and 270-1.

The polyimide-based liquid crystal alignment layer may contain an imide group (—CONHCO—) in a main chain thereof. A bond between carbon (C) and nitrogen (N) of the imide group (—CONHCO—) may be broken. The second regions 190-2 and 270-2 may contain carboxylic acid derivatives. At least one hydrophilic group selected from an amide group (—CONH—, —CONH$_2$, —CONRH, or —CONR$_2$), a carboxylic acid ester group (—OOCR), and a carboxyl group (—COOH) may be contained in the carboxylic acid derivatives formed through the breakage of a bond between carbon (C) and nitrogen (N) of the imide group (—CONHCO—).

Because the hydrophilic surface treatment may be selectively performed only on the second regions 190-2 and 270-2, the possibility that the bond between carbon (C) and nitrogen (N) of the imide group (—CONHCO—) is broken may be lower in the first regions 190-1 and 270-1 than in the second regions 190-2 and 270-2. Thus, the possibility that the first regions 190-1 and 270-1 may contain at least one hydrophilic group selected from an amide group (—CONH—, —CONH$_2$, —CONRH, or —CONR$_2$), a carboxylic acid ester group (—OOCR), and a carboxyl group (—COOH) may be low.

A hydroxyl group (—OH) may be introduced to the first regions 190-1 and 270-1, but the content of the hydroxyl group may be lower in the first regions 190-1 and 270-1 than in the second regions 190-2 and 270-2 on which the hydrophilic surface treatment has been arbitrarily performed.

Water contact angles in the first regions 190-1 and 270-1 and the second regions 190-2 and 270-2 may be different from each other. As described above, the second regions 190-2 and 270-2 may be different from the first regions 190-1 and 270-1 in that the hydrophilic surface modification may be performed on the second regions 190-2 and 270-2. The hydrophilic surface modification may provide a water contact angle of the second regions 190-2 and 270-2, less than that of the first regions 190-1 and 270-1. Specifically, the water contact angle of the second regions 190-2 and 270-2 may be less than that of the first regions 190-1 and 270-1. This will be described in detail with reference to FIG. 9.

The second regions 190-2 and 270-2 may include a hydrophilic surface modified layer. The hydrophilic surface modified layer may be formed as an oxide thin film having a thickness of approximately several nanometers to several micrometers. One surface of the hydrophilic surface modified layer may directly contact the seal line 310 and the other surface thereof may directly contact a surface of a hydrophobic layer which has not been modified to have a hydrophilic surface. The hydrophilic surface modified layer may be classified as a layer in which the bond between carbon (C) and nitrogen (N) of the imide group (—CONHCO—) in the main chain of the polyimide-based liquid crystal alignment layer may be broken, and the hydrophilic group may be introduced, while the hydrophobic layer may be classified as a layer in which the bond between carbon (C) and nitrogen (N) of the imide group (—CONHCO—) in the main chain of the polyimide-based liquid crystal alignment layer may not be broken, and the hydrophilic group may not be introduced. In the second region 190-2, the hydrophilic surface modified layer and the hydrophobic layer may be different from each other in terms of the content of the imide group (—CONHCO—). In other words, the content of the imide group (—CONHCO—) may be lower in the hydrophilic surface modified layer than in the hydrophobic layer. Similarly to this, in the second region 190-2, the content of the hydrophilic group in the hydrophilic surface modified layer may be different from that in the hydrophobic layer.

Figure 5:
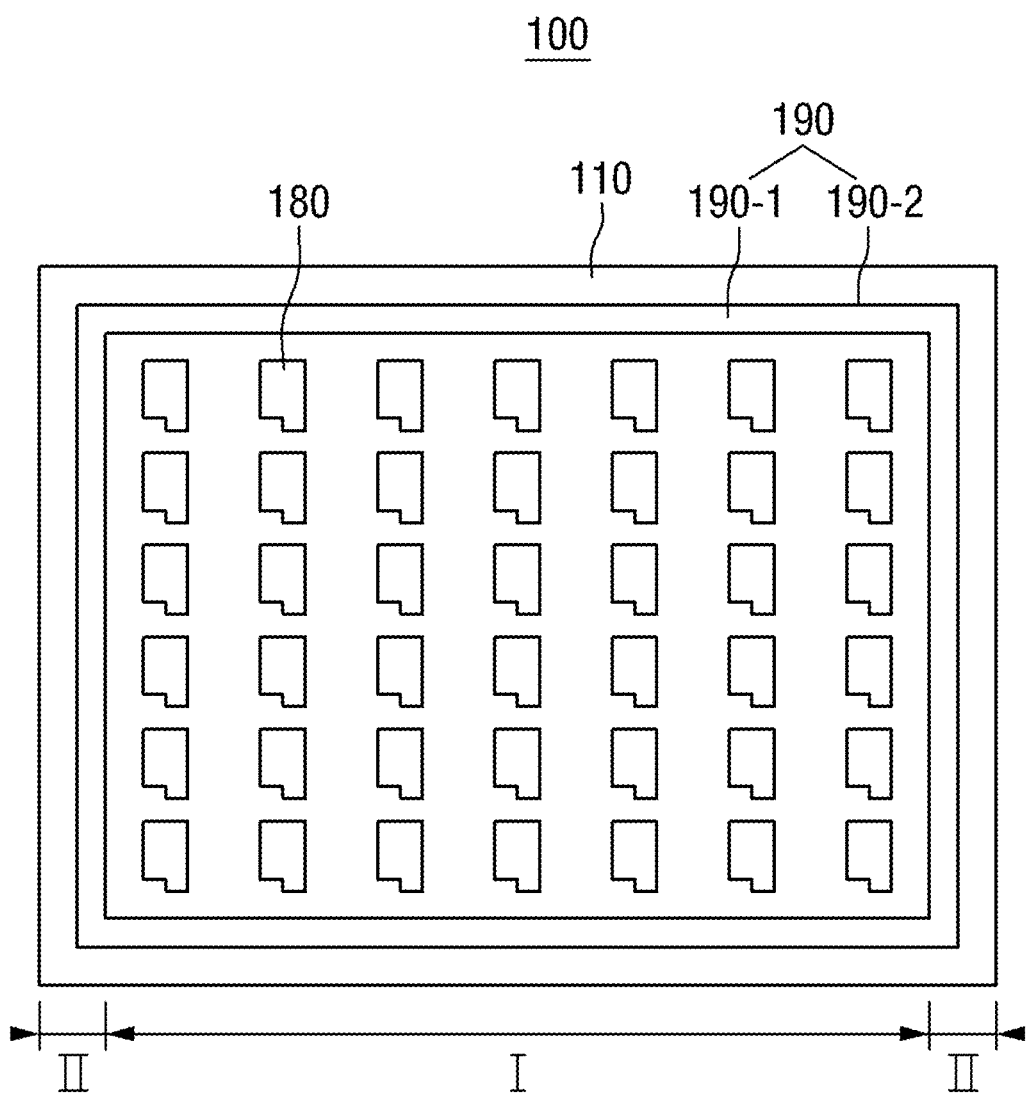
FIG. 5 is a schematic layout view of a first display substrate of the liquid crystal display panel according to the first exemplary embodiment.

FIG. 5 is a schematic layout view of the first display substrate 100 according to a first exemplary embodiment. Referring to FIG. 5, the first liquid crystal alignment layer 190 may cover the display region I and the non-display region II on the first substrate 110. The second region 190-2 may be formed along the outer peripheral portion outside of the display region I on which the pixel electrodes 180 are disposed and may surround an edge of the display region I. At least a portion of the second region 190-2 may be overlapped with a region in which the seal line will be formed. Although the exemplary embodiment illustrates a case in which the second region 190-2 is disposed in an outermost portion of the first liquid crystal alignment layer 190, the invention is not limited thereto. In other words, the first region 190-1 may be present in an outer portion of the second region 190-2.

The hydrophilic surface treatment may be selectively performed on the second region 190-2 through a physical surface modification method or chemical surface modification method. Examples of the physical surface modification method may include a flame treatment, a corona discharge treatment, a plasma treatment, an UV irradiation method and the like, and the chemical surface modification method may be, for example, a plasma polymerization or the like. However, the invention is not limited thereto.

Figure 6:
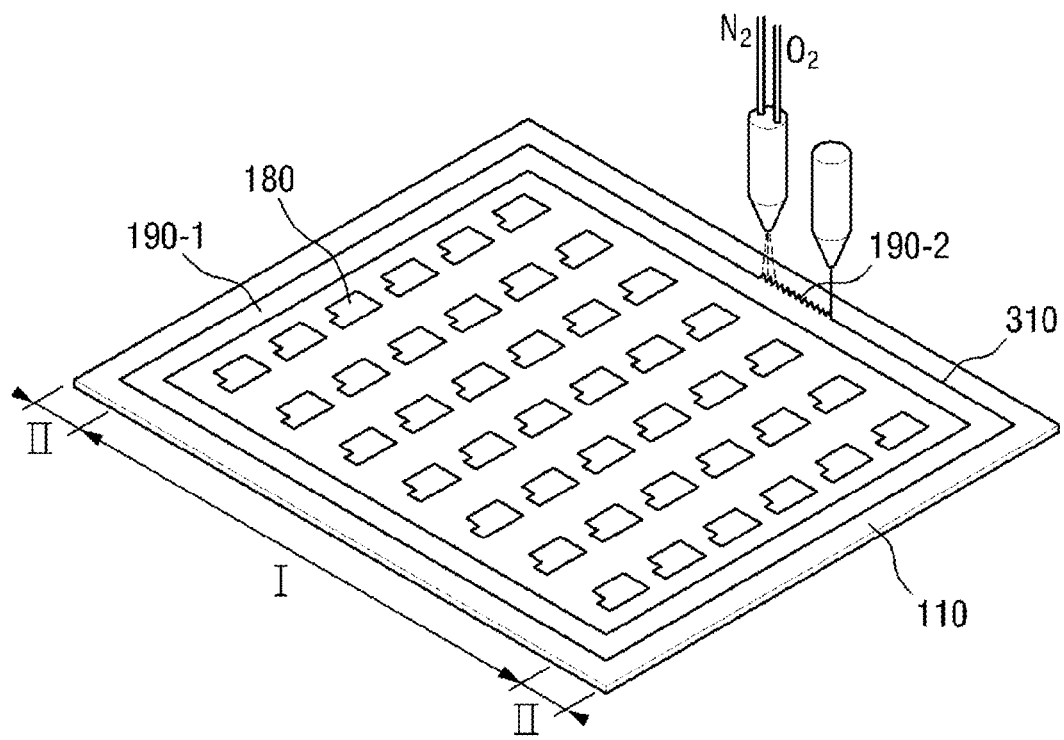
FIG. 6 is a view schematically illustrating a process of performing hydrophilic surface treatment on a second region of a liquid crystal alignment layer of FIG. 5 using an atmospheric plasma (AP plasma) irradiation method and forming a seal line on the second region.

As a non-limited example, FIG. 6 is a view schematically illustrating a process of performing hydrophilic surface treatment on the second region 190-2 of FIG. 5 using an atmospheric plasma (AP plasma) irradiation method and forming the seal line 310 on the second region 190-2.

Referring to FIG. 6, after irradiating oxygen plasma on the second region 190-2 at room temperature, the seal line 310 may be fabricated by applying a sealant or the like to the region overlapped with the second region 190-2 and curing the same.

The bond between carbon (C) and nitrogen (N) of the imide group (—CONHCO—) in the surface of the second region 190-2 may be broken due to the plasma irradiated on the second region 190-2. As the bond between carbon (C) and nitrogen (N) is broken, the hydrophilic group may be introduced to the surface of the second region 190-2. A surface roughness value of the second region 190-2 may be increased due to the plasma irradiated on the second region 190-2. The increase in surface roughness may increase a specific surface area, such that adhesive strength between the surface of the second region 190-2 and the sealant may be physically increased. Referring to FIG. 6, the seal line 310 may be formed by applying a sealant or the like to the region overlapped with the second region 190-2.

In a non-limited example, the hydrophilic surface treatment may use, as a carrier gas, a mixed gas formed of nitrogen ($N_2$) having a purity of 95% to 99% and oxygen ($O_2$) having a purity of 1% to 5%. Nitrogen ($N_2$) may physically influence the second region 190-2 due to a nitrogen radical. Nitrogen ($N_2$) may activate or clean the second region 190-2. Oxygen ($O_2$) may provide a hydrophilic group to the second region 190-2. In selective hydrophilic surface treatment, the plasma may be selectively irradiated only on the second region 190-2 but may not be irradiated on the first region 190-1. Thus, display quality of the liquid crystal display panel 500 may not be affected.

The hydrophilic surface treatment using the atmospheric plasma irradiation method may increase free energy in the second region 190-2, whereby wettability in the second region 190-2 may be improved to increase adhesive strength between the second region 190-2 and the seal line 310.

Figure 7:
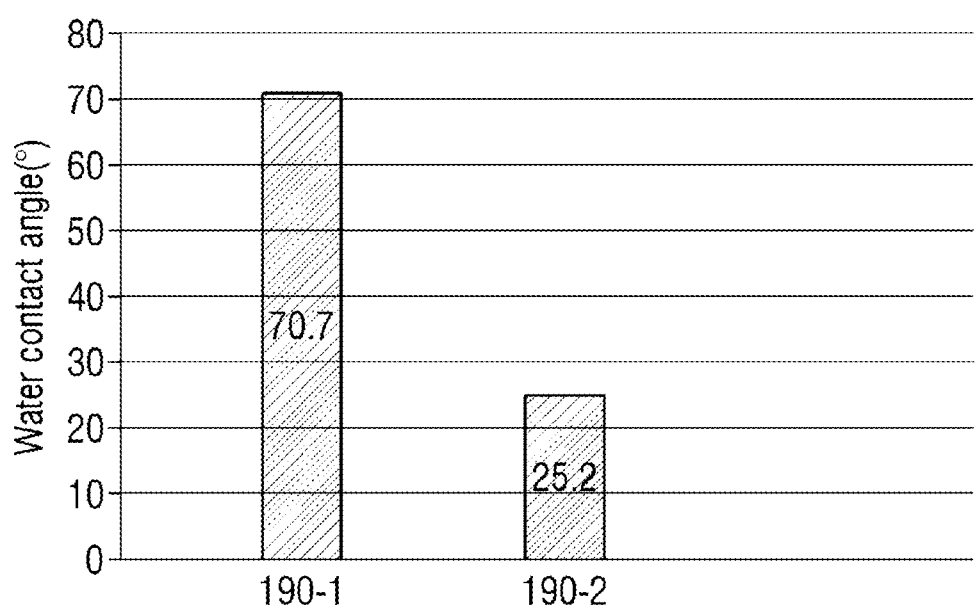
FIG. 7 illustrates an experimental result in which water contact angles of first and second regions of FIG. 6 are compared with each other.

FIG. 7 illustrates an experimental result in which water contact angles of first and second regions 190-1 and 190-2 of FIG. 6 are compared with each other. Referring to FIG. 7, a water contact angle of the first region 190-1 was 70.7° while a water contact angle of the second region 190-2 was 25.2°. As a result of performing hydrophilic surface modification on the second region 190-2 using the atmospheric plasma irradiation method of FIG. 6, it was confirmed that the water contact angle was decreased by approximately 64%. In other words, wettability of the second region 190-2 was improved by approximately 64%, as compared to the first region 190-1.

Figure 8:
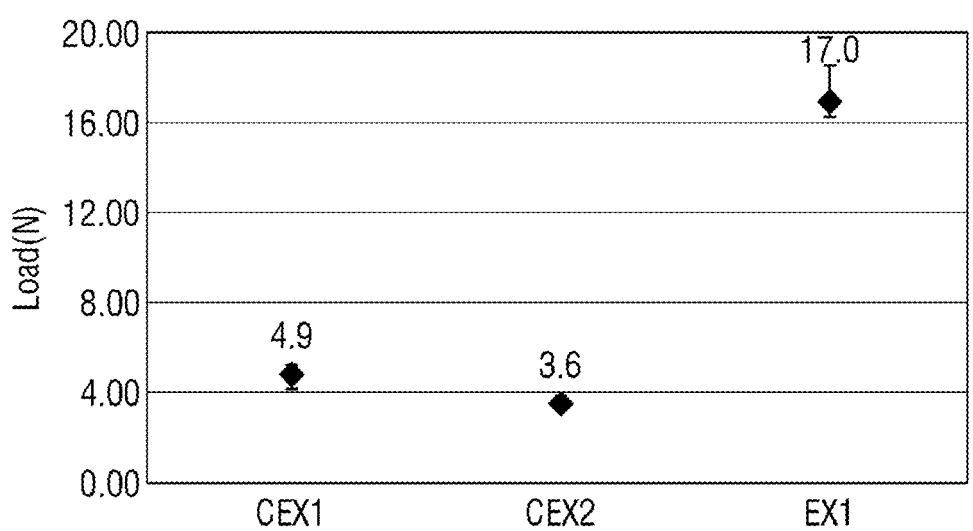
FIG. 8 illustrates an experimental result in which interfacial adhesion between the second region and the seal line of FIG. 6 is compared with interfacial adhesion between the first region and the seal line of FIG. 6.

FIG. 8 illustrates an experimental result in which interfacial adhesion between the second region 190-2 and the seal line 310 of FIG. 6 is compared with interfacial adhesion between the first region 190-1 and the seal line 310 of FIG. 6. Referring to FIG. 8, it could be confirmed that an interfacial adhesion value EX1 between the second region 190-2 and the seal line 310 was 17.0 N while interfacial adhesion values CEX1 and CEX2 between the first region 190-1 and the seal line 310 were 4.9 N and 3.6 N, respectively. As a result of performing hydrophilic surface modification on the second region 190-2 using the atmospheric plasma irradiation method of FIG. 6, it was confirmed that a degree of adhesion was increased by approximately 4.7 times.

Figure 9:
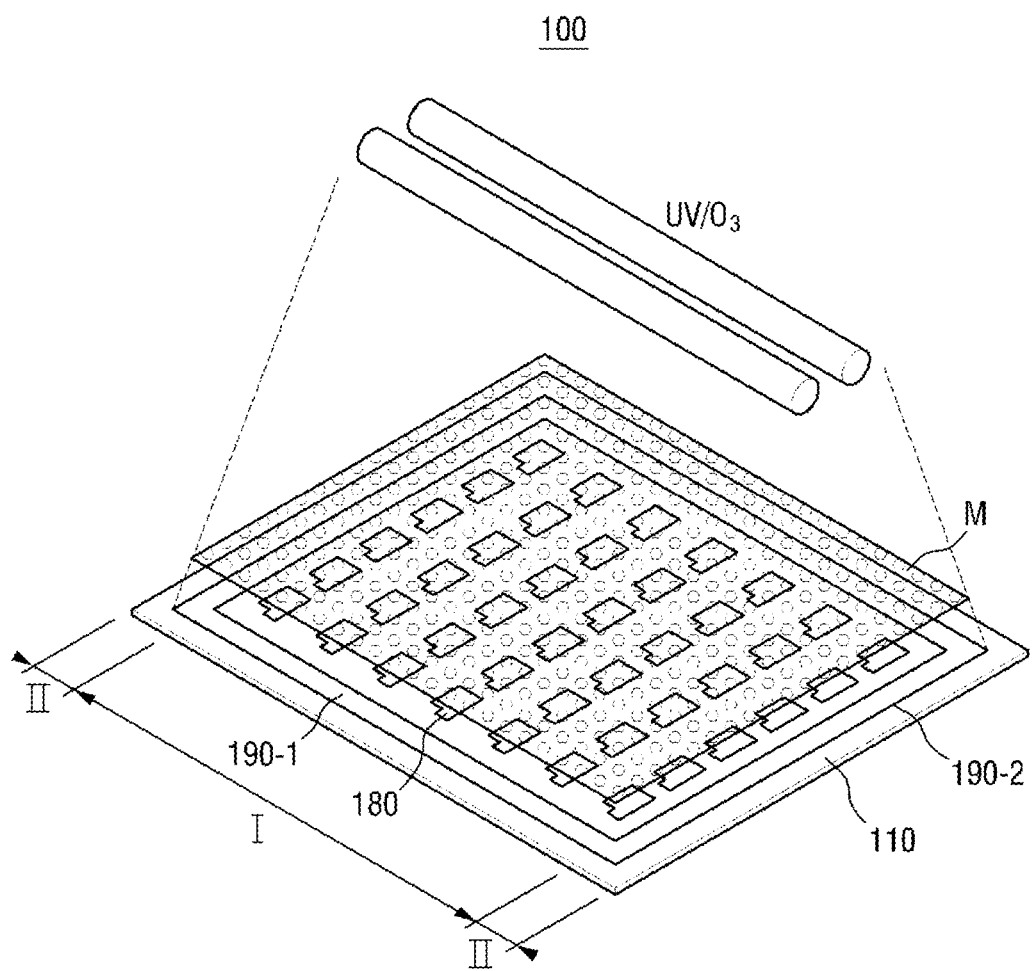
FIG. 9 is a view schematically illustrating a process of performing hydrophilic surface treatment on the second region of the liquid crystal alignment layer of FIG. 5 using a UV ozone treatment method.
Figure 10:
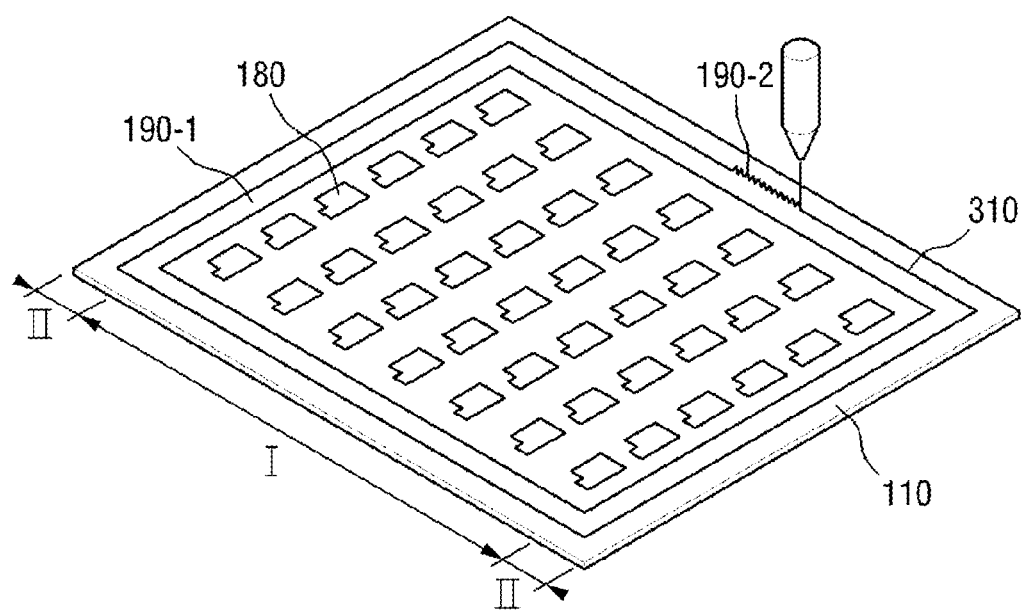
FIG. 10 is a view schematically illustrating a process of applying a sealant or the like to a region overlapped with the hydrophilic surface treated second region of FIG. 8 and forming a seal line.

In a non-limiting example, FIG. 9 is a view schematically illustrating a process of performing hydrophilic surface treatment on the second region 190-2 of the first liquid crystal alignment layer 190 of FIG. 5 using a UV ozone treatment method. FIG. 10 is a view schematically illustrating a process of applying a sealant or the like to a region overlapped with the hydrophilic surface treated second region 190-2 of FIG. 8 and forming the seal line 310.

Referring to FIGS. 9 and 10, the hydrophilic surface treatment of the second region 190-2 using the UV ozone treatment method may be different from the hydrophilic surface treatment using the atmospheric plasma irradiation method of FIG. 6 in that ultraviolet light (UV) is only irradiated onto the non-display region II while the display region I is protected using a mask M.

Referring to FIG. 9, ultraviolet light (UV) is selectively irradiated onto the non-display region II of the first liquid crystal alignment layer 190 in a state in which the display region I is protected using the mask M. Because ultraviolet light (UV) may not be irradiated onto the display region I on which the pixel electrodes 180 are disposed, display quality of the liquid crystal display panel 500 may not be affected thereby.

A surface roughness value of the second region 190-2 may be increased due to the irradiation of ultraviolet light (UV). The bond between carbon (C) and nitrogen (N) of the imide group (—CONHCO—) in the surface of the second region 190-2 may be broken due to the irradiation of ultraviolet light (UV). Ozone ($O_3$) may be generated during the irradiation of ultraviolet light (UV). As the bond between carbon (C) and nitrogen (N) is broken, the hydrophilic group may be introduced to the surface of the second region 190-2. In a non-limited example, a wavelength of ultraviolet light (UV) may range from 180 nm to 250 nm. In a non-limited example, a UV Excimer Laser in a wavelength range of 248 nm may be used.

Ultraviolet light (UV) may decompose contaminants adhered to the surface of the first liquid crystal alignment layer 190 and clean the surface thereof. The hydrophilic group may be introduced to the surface of the second region 190-2 having been cleaned with ultraviolet light (UV). The UV ozone ($O_3$) treatment method may not cause cracking in the surface of the second region 190-2 as compared to the case of irradiating oxygen plasma ($O_2$ plasma), and may result in a thick oxide film that has been modified to have the hydrophilic surface, whereby stability of the second region 190-2 may be improved.

Referring to FIG. 10, after selectively performing hydrophilic surface treatment on the second region 190-2, the mask M may be removed and the seal line 310 may be formed by applying a sealant or the like to the region overlapped with the second region 190-2.

Figure 11:
FIG. 11 illustrates an experimental result in which water contact angles of first and second regions of FIG. 9 are compared with each other.

FIG. 11 illustrates an experimental result in which water contact angles of first and second regions 190-1 and 190-2 of FIG. 9 are compared with each other. Referring to FIG.

11, a water contact angle of the first region 190-1 was 70.7° while a water contact angle of the second region 190-2 was 30.3°. As a result of performing hydrophilic surface modification on the second region 190-2 using the UV ozone (O$_3$) treatment method of FIG. 9, it was confirmed that the water contact angle was decreased by approximately 57%. In other words, wettability of the second region 190-2 was improved by approximately 57%, as compared to the first region 190-1.

Figure 12:
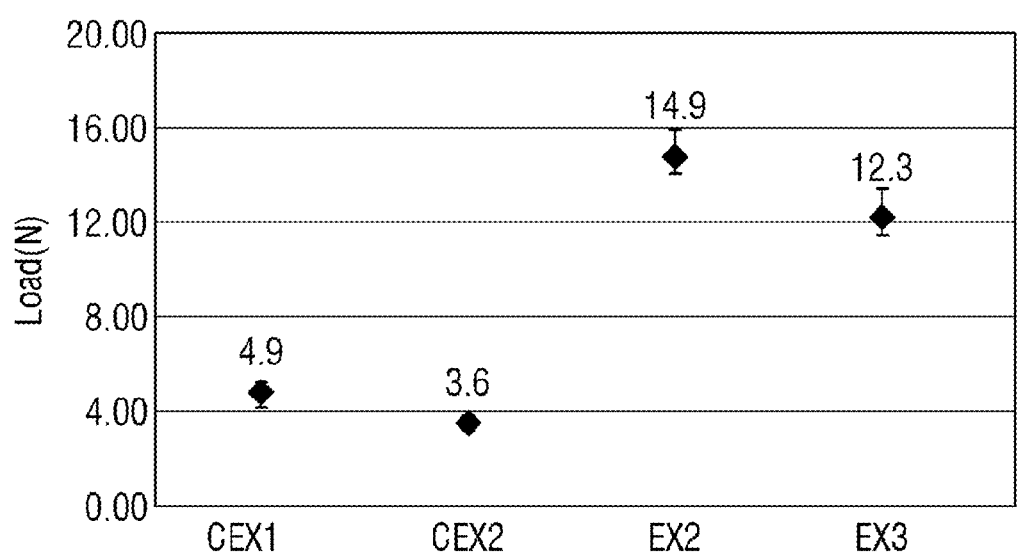
FIG. 12 illustrates an experimental result in which interfacial adhesion between the second region and the seal line of FIG. 9 is compared with interfacial adhesion between the first region and the seal line of FIG. 9.

FIG. 12 illustrates an experimental result in which interfacial adhesion between the second region 190-2 and the seal line of FIG. 9 is compared with interfacial adhesion between the first region 190-1 and the seal line of FIG. 9. Referring to FIG. 12, it could be confirmed that interfacial adhesion values EX2 and EX3 between the second region 190-2 and the seal line 310 were 14.9 N and 12.3 N while interfacial adhesion values CEX1 and CEX2 between the first region 190-1 and the seal line 310 were 4.9 N and 3.6 N, respectively. As a result of performing hydrophilic surface modification on the second region 190-2 using the UV ozone (O$_3$) treatment method of FIG. 9, it was confirmed that degrees of adhesion were increased by approximately 3.4 times and approximately 4.1 times.

Hereinafter, liquid crystal display panels according to other exemplary embodiments will be described. In the following exemplary embodiments, the same reference numerals will be used throughout to designate the same or like elements, and a description of the repeated elements will be omitted or simplified.

Figure 13:
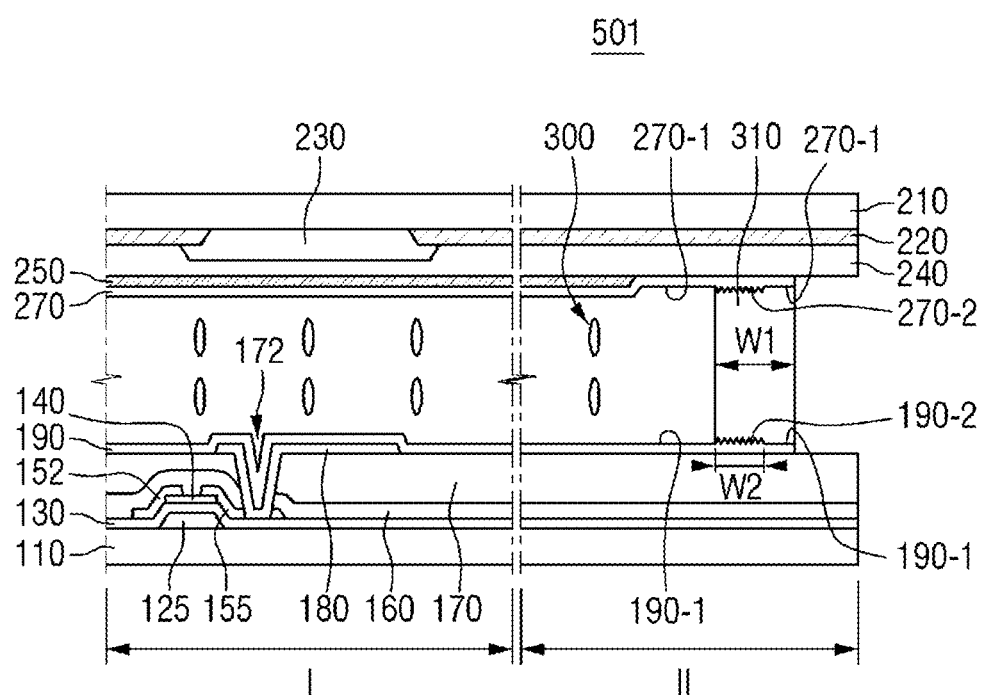
FIG. 13 is a schematic cross-sectional view of a liquid crystal display panel according to a second exemplary embodiment.

FIG. 13 is a schematic cross-sectional view of a liquid crystal display panel 501 according to a second exemplary embodiment. Referring to FIG. 13, the liquid crystal display panel 501 may be different from the liquid crystal display panel 500 of FIG. 2 in that the second regions 190-2 and 270-2 are only formed on portions of the contact interfaces between the seal line 310 and the liquid crystal alignment layers 190 and 270 in the liquid crystal display panel 501, while the second regions 190-2 and 270-2 are formed on the entirety of the contact interfaces between the seal line 310 and the liquid crystal alignment layers 190 and 270 in the liquid crystal display panel 500 of FIG. 2. In other words, unlike the liquid crystal display panel 500 of FIG. 2, all of the first regions 190-1 and 270-1 and the second regions 190-2 and 270-2 may be formed on the contact interfaces between the seal line 310 and the liquid crystal alignment layers 190 and 270. Widths W2 of the second regions 190-2 and 270-2 may be smaller than the width W1 of the seal line 310.

Figure 14:
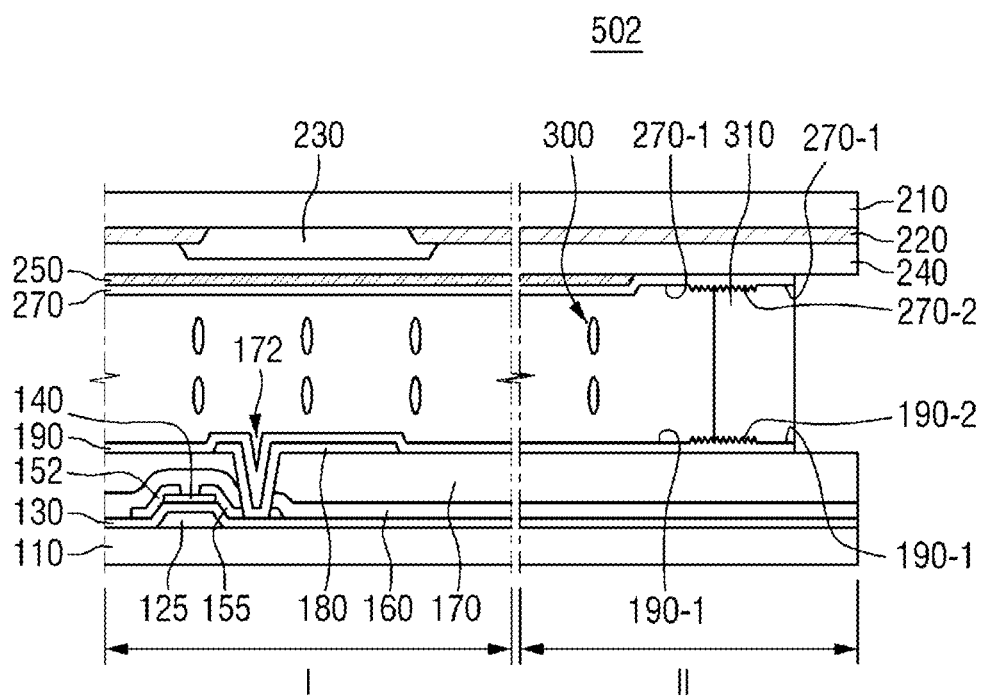
FIG. 14 is a schematic cross-sectional view of a liquid crystal display panel according to a third exemplary embodiment.

FIG. 14 is a schematic cross-sectional view of a liquid crystal display panel 502 according to a third exemplary embodiment. Referring to FIG. 14, the liquid crystal display panel 502 may be different from the liquid crystal display panel 500 of FIG. 2 and the liquid crystal display panel 501 of FIG. 13 in that the second regions 190-2 and 270-2 may contact both the seal line 310 and the liquid crystal layer 300 in the liquid crystal display panel 502, while the second regions 190-2 and 270-2 may not come into contact with the liquid crystal layer 300 in the liquid crystal display panel 500 of FIG. 2 and the liquid crystal display panel 501 of FIG. 13.

Figure 15:
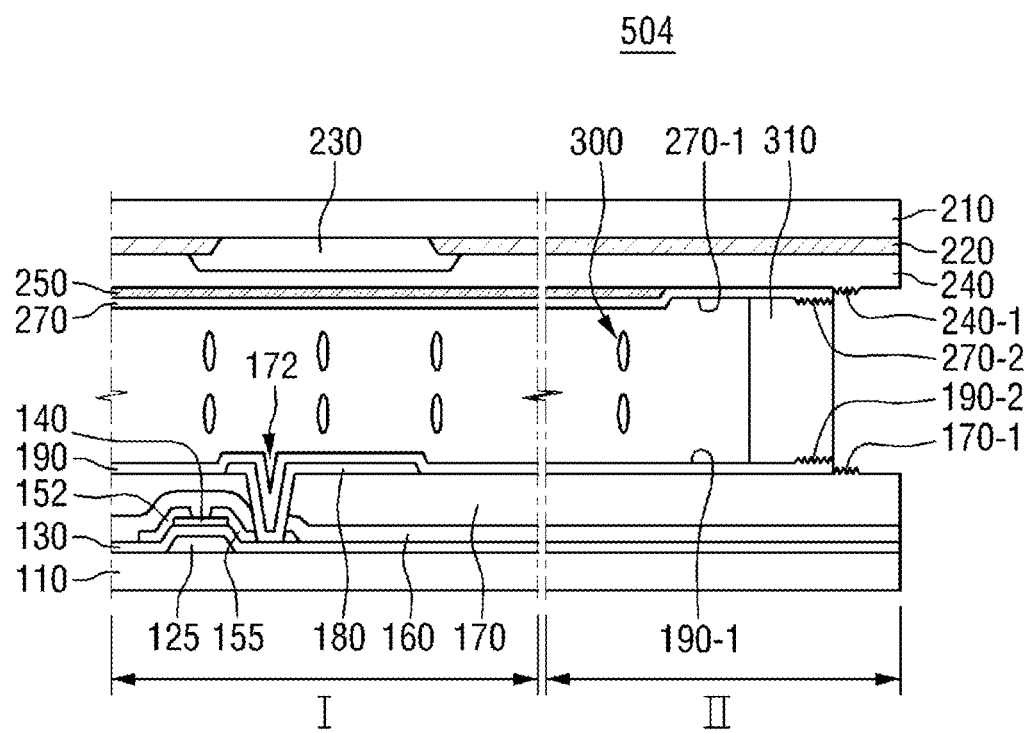
FIG. 15 is a schematic cross-sectional view of a liquid crystal display panel according to a fourth exemplary embodiment.

FIG. 15 is a schematic cross-sectional view of a liquid crystal display panel 504 according to a fourth exemplary embodiment. Referring to FIG. 15, the liquid crystal display panel 504 may be different from the liquid crystal display panel 500 of FIG. 2 in that the hydrophilic surface treatment is performed on a first region 170-1 of the organic layer 170 and a first region 240-1 of the overcoating layer 240 as well as on the second regions 190-2 and 270-2 of the liquid crystal alignment layers 190 and 270 in the liquid crystal display panel 504, while the hydrophilic surface treatment is only performed on the second regions 190-2 and 270-2 of the liquid crystal alignment layers 190 and 270 in the liquid crystal display panel 500 of FIG. 2.

Figure 16:
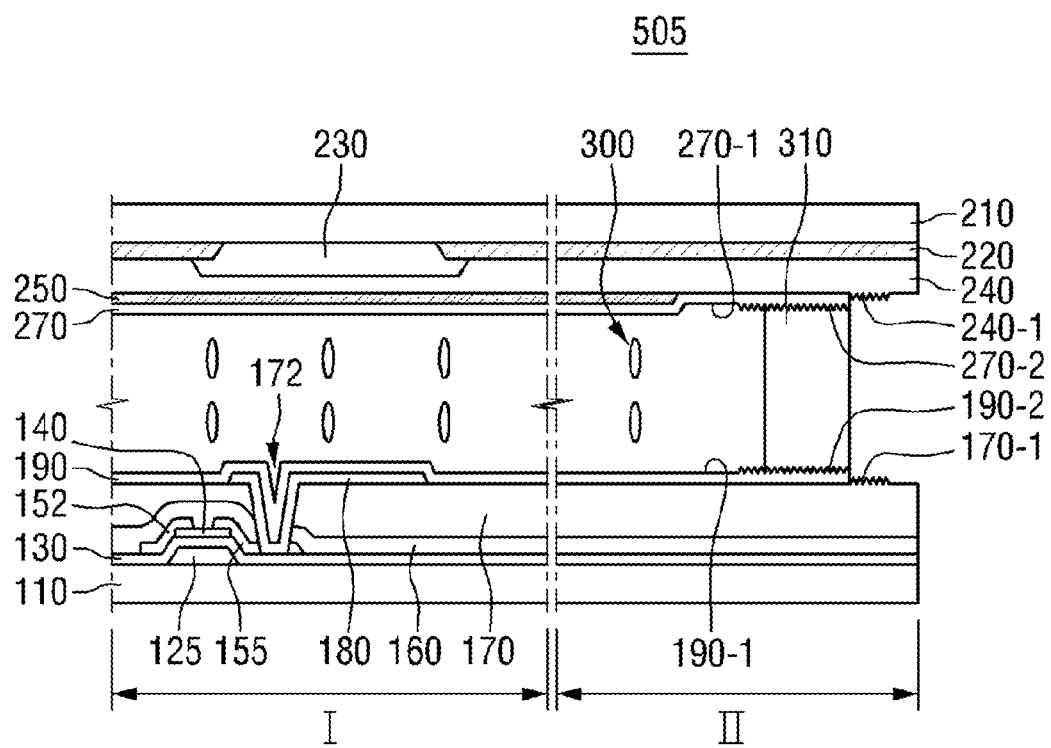
FIG. 16 is a schematic cross-sectional view of a liquid crystal display panel according to a fifth exemplary embodiment.

FIG. 16 is a schematic cross-sectional view of a liquid crystal display panel 505 according to a fifth exemplary embodiment. Referring to FIG. 15, the liquid crystal display panel 505 may be different from the liquid crystal display panel 500 of FIG. 15 in that the second regions 190-2 and 270-2 may contact the seal line 310 and the liquid crystal layer 300 in the liquid crystal display panel 505 while the second regions 190-2 and 270-2 may only be disposed on the contact interfaces of the seal line 310 in the liquid crystal display panel 500 of FIG. 15.

As set forth above, according to exemplary embodiments, interfacial adhesion between a polyimide-based liquid crystal alignment layer and a seal line may be improved.

Sealing properties and a moisture-proofing ratio in an interface between the polyimide-based liquid crystal alignment layer and the seal line may be improved.

Product reliability of a liquid crystal display panel a bezel region having a narrow width may be improved.

While embodiments have been particularly shown and described with reference to example embodiments thereof, it will be understood by those of ordinary skill in the art that various changes in provide and detail may be made therein without departing from the spirit and scope of the disclosure. The example embodiments should be considered in a descriptive sense only and not for purposes of limitation.

What is claimed is:

1. A liquid crystal display panel comprising:
   substrates opposed to each other;
   a liquid crystal layer interposed between the substrates;
   a seal line surrounding an outer peripheral portion of the liquid crystal layer and disposed between the substrates; and
   a liquid crystal alignment layer including a polyimide, the liquid crystal alignment layer including a first region and a second region surrounding the first region and disposed on one surface of at least one of the substrates,
   wherein at least a portion of the second region is overlapped with the seal line, a surface of the second region facing the seal line has greater surface roughness value than a surface of the first region facing the liquid crystal layer.

2. The liquid crystal display panel of claim 1, wherein the second region includes a hydrophilic surface modified layer directly contacting the seal line.

3. The liquid crystal display panel of claim 1, wherein the second region has a content of an imide group (—CONHCO—) lower than that of the first region.

4. The liquid crystal display panel of claim 1, wherein a water contact angle of the second region is less than that of the first region.

5. A liquid crystal display panel comprising:
   substrates opposed to each other;
   a liquid crystal layer interposed between the substrates;
   a seal line surrounding the liquid crystal layer and disposed between the substrates; and
   a liquid crystal alignment layer including a polyimide, the liquid crystal alignment layer including a first region and a second region surrounding the first region and disposed on one surface of at least one of the substrates,
   wherein at least a portion of the second region is overlapped with the seal line, a surface of the second region facing the seal line has greater content of a hydrophilic group than a surface of the first region facing the liquid crystal layer.

6. The liquid crystal display panel of claim 5, wherein the hydrophilic group is at least one selected from a group consisting of a hydroxyl group (—OH), an amide group (—CONH—, —CONH$_2$, —CONRH, or —CONR$_2$), a carboxylic acid ester group (—OOCR) and a carboxyl group (—COOH).

7. The liquid crystal display panel of claim 6, wherein the content of the hydrophilic group selected from a group consisting of the amide group (—CONH—, —CONH$_2$, —CONRH, or —CONR$_2$), the carboxylic acid ester group (—OOCR) and the carboxyl group (—COOH) is higher in the second region than in the first region.

8. The liquid crystal display panel of claim 5, wherein a surface roughness value of the second region is greater than that of the first region.

9. The liquid crystal display panel of claim 8, wherein the second region includes a hydrophilic surface modified layer directly contacting the seal line.

10. The liquid crystal display panel of claim 5, wherein the second region has a content of an imide group (—CONHCO—) relatively lower than that of the first region.

11. The liquid crystal display panel of claim 5, wherein a water contact angle of the second region is less than that of the first region.

12. A method of manufacturing a liquid crystal display panel, the method comprising:
selectively performing hydrophilic surface treatment on only a second region of first and second regions of a liquid crystal alignment layer including a polyimide; and
after performing hydrophilic surface treatment, applying a sealant to the second region.

13. The method of claim 12, wherein the hydrophilic surface treatment is selectively performed on the second region through a surface modification method selected from a group consisting of a flame treatment, a corona discharge treatment, a plasma treatment, an UV irradiation method and a plasma polymerization.

14. The method of claim 12, wherein a water contact angle of the second region is lesser than that of the first region.

15. The method of claim 12, wherein the second region has a content of an imide group (—CONHCO—) relatively lower than that of the first region.

16. The method of claim 12, wherein the second region has a content of a hydrophilic group greater than that of the first region.

17. The method of claim 16, wherein the hydrophilic group is at least one selected from a group consisting of a hydroxyl group (—OH), an amide group (—CONH—, —CONH$_2$, —CONRH, or —CONR$_2$), a carboxylic acid ester group (—OOCR) and a carboxyl group (—COOH).

18. The method of claim 17, wherein the content of the hydrophilic group is selected from a group consisting of the amide group (—CONH—, —CONH$_2$, —CONRH, or —CONR$_2$), the carboxylic acid ester group (—OOCR) and the carboxyl group (—COOH) is higher in the second region than in the first region.

19. The method of claim 12, wherein a surface roughness value of the second region is greater than that of the first region.

20. The method of claim 19, wherein the second region includes a hydrophilic surface modified layer directly contacting the seal line.

* * * * *